United States Patent
Li et al.

(10) Patent No.: US 11,579,924 B2
(45) Date of Patent: Feb. 14, 2023

(54) SCHEDULING ARTIFICIAL INTELLIGENCE MODEL PARTITIONS BASED ON REVERSED COMPUTATION GRAPH

(71) Applicant: EMC IP Holding Company LLC, Hopkinton, MA (US)

(72) Inventors: Jin Li, Shanghai (CN); Jinpeng Liu, Shanghai (CN); Christopher S. MacLellan, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 231 days.

(21) Appl. No.: 16/789,006

(22) Filed: Feb. 12, 2020

(65) Prior Publication Data

US 2021/0248002 A1 Aug. 12, 2021

(51) Int. Cl.
| | |
|---|---|
| *G06F 9/48* | (2006.01) |
| *G06N 20/00* | (2019.01) |
| *G06F 9/50* | (2006.01) |
| *G06N 5/02* | (2023.01) |

(52) U.S. Cl.
CPC .......... *G06F 9/4881* (2013.01); *G06F 9/5027* (2013.01); *G06F 9/5038* (2013.01); *G06F 9/5066* (2013.01); *G06N 5/027* (2013.01); *G06N 20/00* (2019.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 11,153,228 B1 * | 10/2021 | Hosamani | ........... | H04L 41/0806 |
| 2012/0209989 A1 * | 8/2012 | Stewart | ................. | G06F 9/5061 |
| | | | | 709/224 |
| 2014/0118355 A1 * | 5/2014 | Vassilvitskii | ....... | G06F 16/9024 |
| | | | | 345/440 |
| 2014/0280143 A1 * | 9/2014 | Milenova | ................ | G06F 16/35 |
| | | | | 707/737 |

(Continued)

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.

(Continued)

*Primary Examiner* — Meng Ai T An
*Assistant Examiner* — Zujia Xu
(74) *Attorney, Agent, or Firm* — Ryan, Mason & Lewis, LLP

(57) ABSTRACT

Techniques are disclosed for scheduling artificial intelligence model partitions for execution in an information processing system. For example, a method comprises the following steps. An intermediate representation of an artificial intelligence model is obtained. A reversed computation graph corresponding to a computation graph generated based on the intermediate representation is obtained. Nodes in the reversed computation graph represent functions related to the artificial intelligence model, and one or more directed edges in the reversed computation graph represent one or more dependencies between the functions. The reversed computation graph is partitioned into sequential partitions, such that the partitions are executed sequentially and functions corresponding to nodes in each partition are executed in parallel.

20 Claims, 14 Drawing Sheets

610

(56) References Cited

U.S. PATENT DOCUMENTS

| | | | | |
|---|---|---|---|---|
| 2014/0380322 | A1* | 12/2014 | Ailamaki | G06F 9/505 718/102 |
| 2018/0075098 | A1* | 3/2018 | Yin | G06F 16/24561 |
| 2018/0083828 | A1* | 3/2018 | Cartaya | H04L 41/0803 |
| 2018/0136912 | A1* | 5/2018 | Venkataramani | G06N 3/04 |
| 2018/0203673 | A1* | 7/2018 | Ravishankar | G06F 9/4494 |
| 2019/0324810 | A1 | 10/2019 | Zhao et al. | |

OTHER PUBLICATIONS

Jia et al., "Beyond Data and Model Parallelism for Deep Neural Networks," Proceedings of the 2nd SysML Conference, Palo Alto, CA, Jul. 2018, 13 pages.

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," arXiv:1901.02067v1, Jan. 7, 2019, 13 pages.

U.S. Appl. No. 16/540,385 filed in the name of Jinpeng Liu et al., filed Aug. 14, 2019 and entitled "Method, a Device and a Computer Program Product for Determining a Resource Required for Executing a Code Segment.".

U.S. Appl. No. 16/542,757 filed in the name of Jinpeng Liu et al., filed Aug. 16, 2019 and entitled "Method, Device and Computer Program Product for Processing Machine Learning Model.".

U.S. Appl. No. 16/678,758 filed in the name of Jinpeng Liu et al., filed Nov. 8, 2019 and entitled "Method, Electronic Device and Computer Program Product for Processing Machine Learning Model.".

\* cited by examiner

210

220

| | Funtion | Mem(Bytes) |
|---|---|---|
| 0 | fused_multiply_6 | 6144 |
| 1 | fused_expand_dims_2 | 8192 |
| 2 | fused_sqrt | 2048 |
| 3 | fused_nn_relu_4 | 131072 |
| 4 | fused_nn_conv2d_2 | 151257088 |
| 5 | fused_negative_1 | 4096 |
| 6 | fused_add_5 | 2052 |
| 7 | fused_add_11 | 16388 |
| 8 | fused_multiply_9 | 49152 |
| 9 | fused_nn_conv2d_4 | 30273824 |
| 10 | fused_add_12 | 24576 |
| 11 | fused_sqrt_1 | 4096 |
| 12 | fused_negative_4 | 32768 |
| 13 | fused_nn_relu_7 | 1048576 |
| 14 | fused_multiply_3 | 1050624 |
| 15 | fused_transpose | 32768 |
| 16 | fused_nn_bias_add_4 | 1050624 |
| 17 | fused_nn_softmax | 80 |
| 18 | fused_nn_bias_add_5 | 2098176 |
| 19 | fused_add_3 | 1050624 |
| 20 | fused_nn_global_avg_pool2d | 32768 |
| 21 | fused_multiply_5 | 3072 |
| 22 | fused_add_6 | 3072 |
| 23 | fused_nn_relu_9 | 2097152 |
| 24 | fused_add_13 | 32772 |
| 25 | fused_nn_max_pool2d_1 | 103840 |
| 26 | fused_nn_relu_2 | 65536 |
| 27 | fused_nn_relu_1 | 131072 |
| 28 | fused_multiply_1 | 270336 |
| 29 | fused_multiply_8 | 24576 |
| : | : | : |
| 51 | fused_divide | 2052 |

```
Graph G = G₀ // set the original graph as the initial graph
// Reverse the computation Graph and calculate the IN degrees for all Nodes
// Loop the Adjacent List of Graph G₀:
For every Vertex vᵢ in the adjacent list
    // vᵢ and vⱼ are the vertices in G₀
    If there is an edge from vᵢ to vⱼ
        // vᵢᵣ and vⱼᵣ are the vertices in the reversed CG Gᵣ
        Add an edge from vⱼᵣ to vᵢᵣ
        IN degree of vᵢᵣ ++
N = number of vertices in Gᵣ
Lₛ = [] // Initialize an empty list While N != 0
    Set S = {} // Initialize an empty set for current iteration
    for i = 0..N
        // process all vertices who's in degrees are 0
        if V[i] == 0 begin
            // get the resource requirement for this computation node
            if the remaining resource is enough for this node
                // remove incident edges of vertex i from the graph Gᵣ
                for all edges e from i to j begin
                    V[j] --; // decrease the IN degree for node j
                    remove edge e from Gᵣ;
                end for
                // remove the vertex itself from the graph Gᵣ
                remove vertex i from Gᵣ
                // decrease the number of vertices in the graph
                N--;
                // add the vertex i into current set
                add vertex i into s
            else
                // if the remaining resource is not enough, stop this
                // iteration and the nodes which could be executed in
                // parallel with the current tasks in set s are left to the
                // next iteration with other computation nodes,
                // whether they are independent or not
                break
            endif
    end for
    // here all vertices whose in degrees are 0 and can be accommodated in
    // available resource at this moment
    // are processed and the original graph has been degenerated into
    // a new sub-graph // add the subset s into the list
    Insert before s to Lₛ
end while
return Lₛ
```

SCHEDULING ARTIFICIAL INTELLIGENCE MODEL PARTITIONS BASED ON REVERSED COMPUTATION GRAPH

FIELD

The field relates generally to information processing systems, and more particularly to techniques for scheduling artificial intelligence (AI) model partitions in such information processing systems.

BACKGROUND

In recent years, with the progress of artificial intelligence (AI) technology, application programs that employ AI models (such as, but not limited to, machine learning (ML) applications, deep learning (DL) applications, and data mining (DM) applications) have enabled significant development in many fields. However, as AI models become more complicated and need larger data sets, execution of such models requires more computing resources. Currently, due to limitations of computing capability and communication bandwidth of computing devices, a single computing device cannot typically satisfy the demands of a large-scale AI model. Therefore, efficient deployment and execution of AI models has become a focus of current research.

SUMMARY

Embodiments provide techniques for scheduling AI model partitions for execution in an information processing system.

For example, in an illustrative embodiment, a method comprises the following steps. An intermediate representation of an artificial intelligence model is obtained. A reversed computation graph corresponding to a computation graph generated based on the intermediate representation is obtained. Nodes in the reversed computation graph represent functions related to the artificial intelligence model, and one or more directed edges in the reversed computation graph represent one or more dependencies between the functions. The reversed computation graph is partitioned into sequential partitions, such that the partitions are executed sequentially and functions corresponding to nodes in each partition are executed in parallel.

Advantageously, illustrative embodiments provide a scheduling solution that uses a reversed computation graph to implement a "scheduling at last moment" (SALM) policy to achieve scheduling with improved efficiency in terms of parallel computation and resource usage.

BRIEF DESCRIPTION OF THE DRAWINGS

FIG. 3 illustrates a memory resource requirement for each partitioned set of functions associated with an artificial intelligence model with which one or more illustrative embodiments can be implemented.

FIG. 7 illustrates a partition and scheduling algorithm associated with an artificial intelligence model according to an illustrative embodiment.

FIGS. 8A through 8F illustrate a use case comparison for a partition and scheduling algorithm associated with an artificial intelligence model according to an illustrative embodiment.

DETAILED DESCRIPTION

Figure 1:
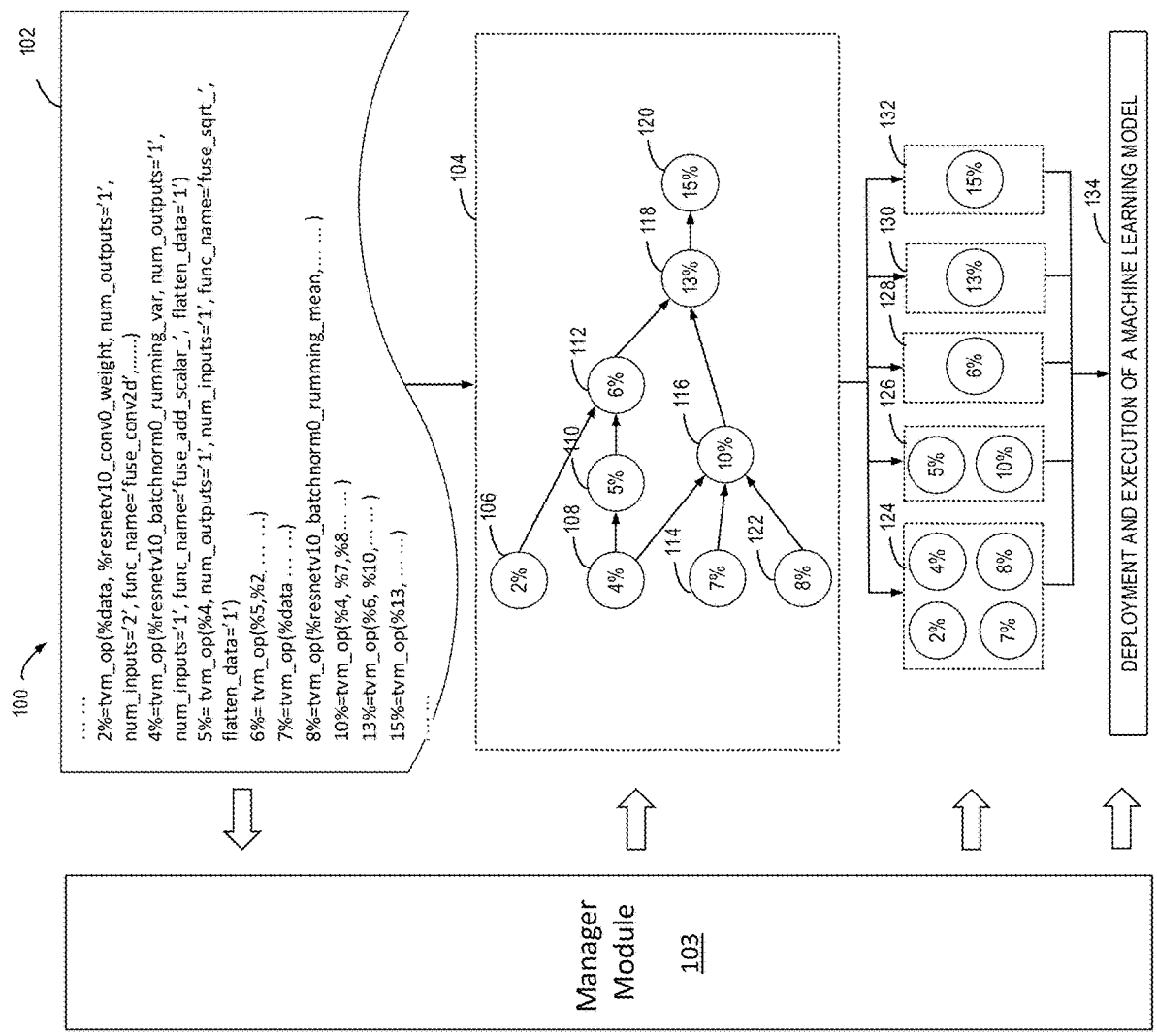
FIG. 1 illustrates an information processing system for processing an artificial intelligence model with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

When an AI model, such as a machine learning (ML) model as will be used in examples herein, is utilized to process data, data is processed in parallel at least in an initial stage. In this manner, in a conventional approach, every computing device (machine) in a given network that executes the subject application, executes the entire ML model thereon to process a respective part of data. However, the growth of ML models has resulted in a single computing device being unable to execute the entire ML model independently. Thus, the concept of model parallelism is employed to execute a large, complicated ML model. For example, model parallelism is when the ML model is split among computing devices such that each computing device works on a part of the ML model.

Application program developers usually adopt a specified framework to write an ML model and define a corresponding neural network layer by layer. Hence, when model parallelism is used to process an ML model, different layers in the ML model are usually distributed to different computing devices. However, when a framework or a compiler is compiling an ML model program, a single binary program is typically generated. At this point, the generated program has very little information about how to organize the layers. Therefore, the framework and the developers have difficulty splitting the entire computing task from the single binary program into different computing nodes layer by layer.

In addition, different parameter formats are employed in different neural networks. For example, parameter formats in a convolution neural network (CNN) and a recursive neural network (RNN) are different. Even in the same type of neural networks (e.g., CNN), different partitioning solutions may also bring about different parameter formats since the numbers of layers and nodes in the layers are different. Consequently, it is difficult to implement model parallelism for an ML model.

In order to address the above-mentioned challenges, a solution is proposed in U.S. patent application Ser. No. 16/678,758, filed on Nov. 8, 2019, and entitled "Method, Electronic Device and Computer Program Product for Processing Machine Learning Model," the disclosure of which is incorporated by reference herein in its entirety. In the above-referenced U.S. patent application, an improved method for processing an ML model is provided. In the method, an intermediate representation of an ML model written in a source language is obtained. Then, a computation graph is generated based on the intermediate representation. A manager module partitions the computation graph into a plurality of parts (partitions) in sequence according to in-degrees of nodes, such that the parts of the plurality of parts are executed sequentially, and functions in each part are executed in parallel. The computation graph has nodes connected by edges. An "in-degree" (or IN degree) of a node represents the number of edges directed to the node. Through the above method, processing an ML model is implemented at a function level, rather than at an instruction level. Therefore, the processing of an ML model is more efficient and feasible. In addition, the method does not require inter-layer and intra-layer communication of an ML model, and does not need to divide a parameter tensor, an error tensor, and the like. In addition, this automatic partitioning method of the above-referenced U.S. patent application is more efficient in terms of time and space. Further, as partitioning can be implemented prior to executing an ML model, training time can be saved.

FIG. 1 illustrates an information programming system 100 in which embodiments can be implemented. As shown in FIG. 1, in system 100, an intermediate representation 102 of an ML model is obtained from the ML model written in a source language. In some embodiments, an ML model compiled in a source language may be written in different source languages, for example, CUDA, Java, Python, C++, Fortran, Ada, C#, and the like. In some embodiments, an ML model written in a source language may be determined by different frameworks. The above example is provided merely for illustrative purposes and not intended to be limiting.

In some embodiments, the intermediate representation 102 of the ML model may be obtained by a compiler through compiling the ML model written in a source language. Compiling refers to a procedure of transforming a source code/original code written in a source language into a machine code or local code of a target architecture. The intermediate representation 102 is a data structure or code for representing source code. In some embodiments, the intermediate representation 102 of the ML model may be obtained in other manners, for example, a programmer may transform an ML model, initially written in a source language, into an intermediate representation 102 of the ML model according to compiling rules of a compiler.

In some embodiments, the intermediate representation 102 of the ML model may be described in a structured text. For example, the intermediate representation 102 may include an intermediate representation of an ML model described in the format of JavaScript Object Notation (JSON) or Extensible Markup Language (XML).

The intermediate representation 102 of the ML model is conveyed to a manager module 103. The manager module 103 is configured for processing the received intermediate representation 102 of the ML model to partition the ML model. The manager module 103 may be implemented in software and/or hardware. The manager module 103 generates a computation graph 104 based on the intermediate representation 102 of the ML model. Nodes in the computation graph 104 represent functions in the ML model. The computation graph 104 also illustrates dependencies between functions using directed edges. For example, a directed edge in the computation graph 104 represents that an input of a function corresponding to the end point of the directed edge is dependent on an output of a function corresponding to the starting point of the directed edge. Additionally, or alternatively, the computation graph 104 can be a directed acyclic graph.

As further shown in FIG. 1, the computation graph 104 obtained from the intermediate representation 102 of the ML model includes: a node 106, a node 108, a node 110, a node 112, a node 114, a node 116, a node 118, a node 120 and a node 122. Each node in the computation graph 104 represents a function in the ML model, and a connection line (directed edge) between nodes represents a dependency between functions. For example, the output of the node 106 is transmitted to the node 112 and the output of the node 110 is transmitted to the node 112. Therefore, the node 112 is dependent on both the node 106 and the node 110. The computation graph 104 in FIG. 1 is provided merely as an example for describing a computation graph. The number of nodes in a computation graph and the structure of the computation graph may be generated in any appropriate form, based on an intermediate representation 102 of the ML model.

The manager module 103 is also configured to partition the computation graph 104 generated from the intermediate representation 102 of the ML model into a plurality of parts in sequence, including: a first part 124, a second part 126, a third part 128, a fourth part 130, and a fifth part 132. In some embodiments, the manager module 103 partitions the computation graph 104 based on in-degrees of nodes (recall in-degree of a node represents the number of directed edges directed to the node).

Still further, the manager module 103 is configured to apply the first part 124, the second part 126, the third part 128, the fourth part 130, and the fifth part 132 to deployment and execution of the ML model. Deployment and execution operations are depicted by block 134. In some embodiments, the respective parts are executed sequentially during execution, and functions in respective parts may be executed in parallel.

Figure 2A:
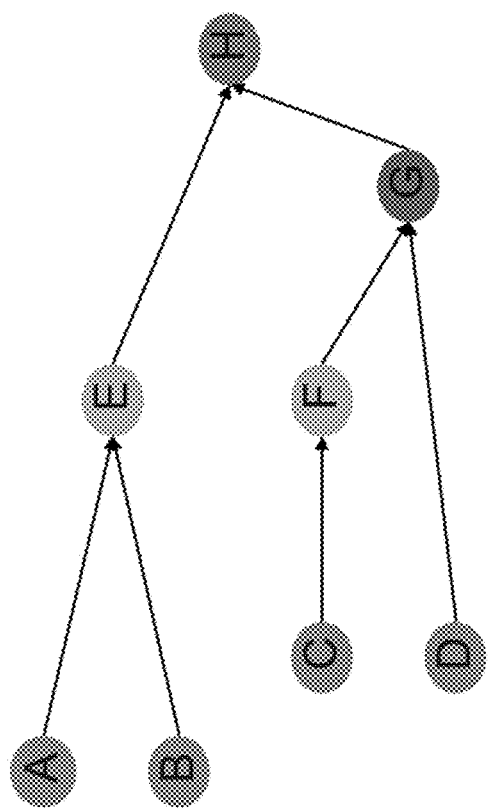
FIGS. 2A and 2B illustrate a computation graph and partitioned sets of functions, respectively, associated with an artificial intelligence model with which one or more illustrative embodiments can be implemented.
Figure 2B:
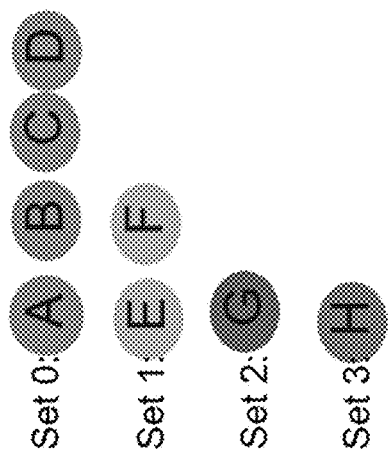

More particularly, with respect to deployment and execution 134, the manager module 103 can employ a partition and scheduling algorithm that partitions nodes (functions) in a computation graph into independent sets (parts) and schedule each set into computing devices for execution. FIGS. 2A and 2B illustrate an example of such a partition and scheduling algorithm. More particularly, FIG. 2A shows a computation graph 210 with nodes A, B, C, D, E, F, G and H connected by directed edges as shown. Recall that nodes are functions or computations associated with the intermediate representation of an ML model. Note that node H is dependent of nodes E and G, node E is dependent of nodes A and B, node G is dependent of nodes D and F, and node F is dependent of node C. FIG. 2B shows an output 220 of independent sets (parts) whereby nodes A, B, C and D are in Set 0, nodes E and F are in Set 1, node G is in Set 2 and node H is in Set 3. Note that the order of execution of the nodes proceeds from lowest set number to highest set number, i.e., nodes in Set 0 are executed first, then nodes in Set 1, then nodes in Set 2, and then nodes in Set 3. Further, each set has multiple functions which are independent of each other and can be scheduled into computing devices for execution. For example, functions for nodes E and F are independent of one another. However, some functions in a specified set are dependent on functions in the previous nodes in the list, for example, node E in Set 1 is dependent on nodes A, B in Set 0, while node F in Set 1 is dependent on node C in Set 0. Thus, scheduling can be a challenge for manager module 103.

Furthermore, in addition to managing interdependencies of functions, another challenge for executing functions is that the computing devices typically leverage resources (e.g., computing resources and storage resources) of dedicated processing units such as, by way of example, graphical processing units or GPUs. Architecturally, a GPU is typically composed of hundreds of cores that can handle thousands of processing threads simultaneously while, in comparison, a central processing unit or CPU is composed of a few cores that can handle a few processing threads at a time. Despite the large parallel computing capabilities of a GPU, attention needs to be focused during processing and analysis of a function, on how many processing threads and memory are needed for computation.

For example, in an Everything-as-a-Service (XaaS) framework, functions from sets (e.g., FIG. 2B) can be scheduled into multiple dedicated processing units. In an ML model framework based on an intermediate representation operating in a model parallelism manner, the scheduler (e.g., manager module 103) needs to know how much memory and how many threads/blocks/streaming multiprocessors (SMs) are needed to execute one or several functions in a specific dedicated processing unit. In all cases, to effectively schedule the function, it is necessary to know the resource requirement of this function before actually executing the function.

Figure 4:
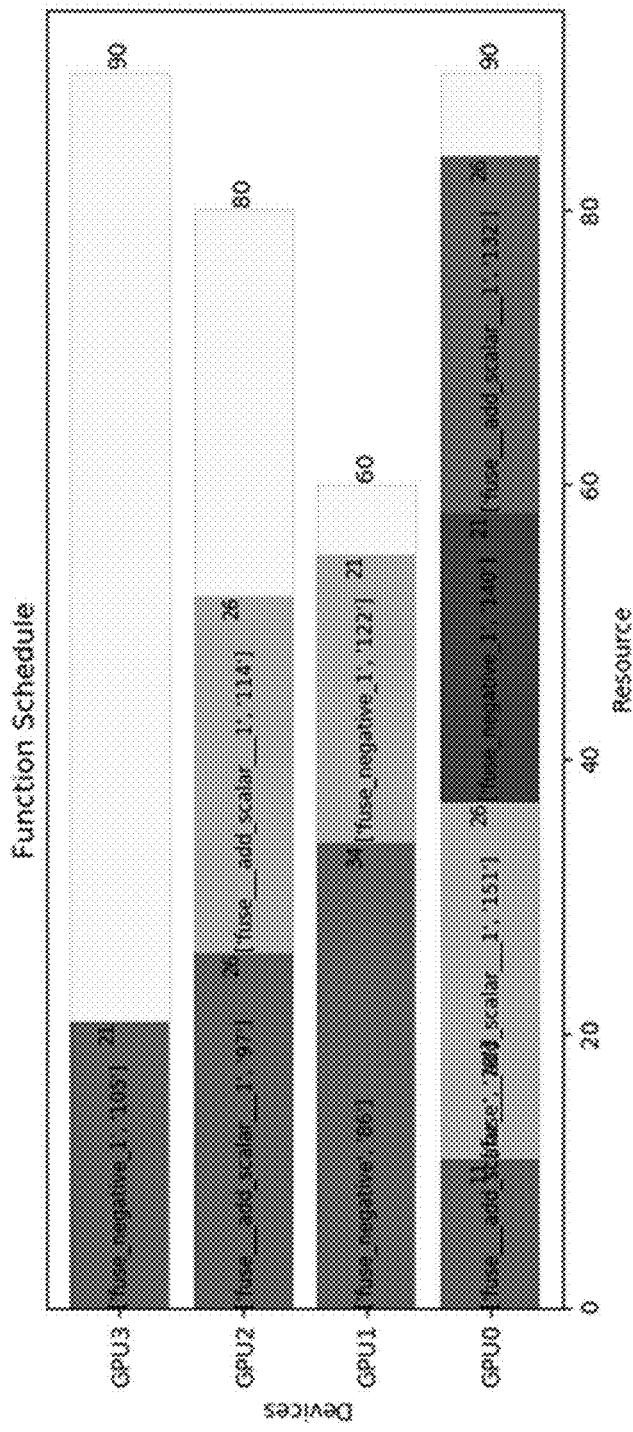
FIG. 4 illustrates a partition schedule based on resources with which one or more illustrative embodiments can be implemented.

In U.S. patent application Ser. No. 16/540,385, filed on Aug. 14, 2019, and entitled "A Method, a Device and a Computer Program Product for Determining a Resource Required for Executing a Code Segment," the disclosure of which is incorporated by reference herein in its entirety, techniques are disclosed that provide for creation of a dummy compiler from an open-source real compiler to collect resource requirements (e.g., memory/thread) from allocation statements generated by the compiler for a given function so that memory manager 103 can know how many memory/threads are needed for the given function. By way of example only, FIG. 3 illustrates an example 300 of memory requirements for each computation in a given ML model, i.e., a Keras Cifar10 model. Based on the above-referenced techniques, partitions from a neural network associated with an ML model can be scheduled based on resource requirements and resources available on the computing devices. FIG. 4 illustrates an example 400 of a partition schedule where "Devices" refer to GPUs and "Resource" refers to cores in each GPU.

Figure 5A:
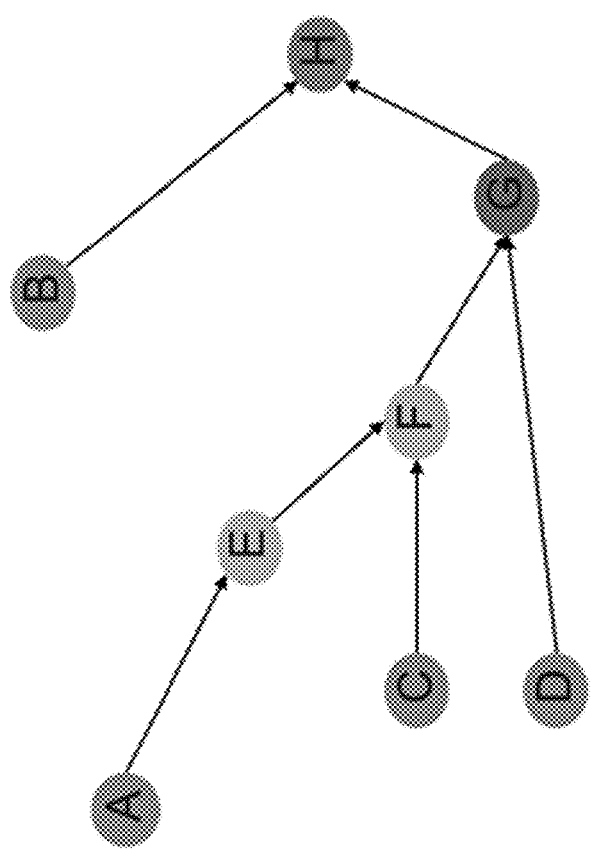
FIGS. 5A and 5B illustrate a computation graph and partitioned sets of functions, respectively, associated with an artificial intelligence model with which one or more illustrative embodiments can be implemented.
Figure 5B:
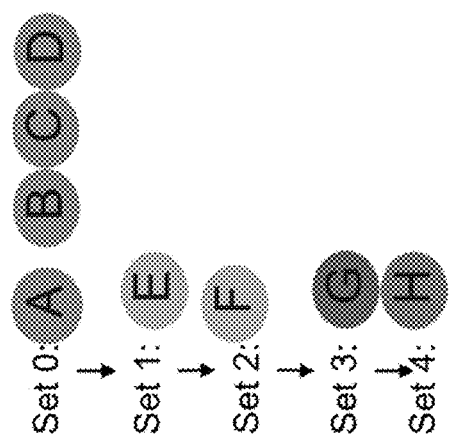

However, a resource-based scheduling algorithm as mentioned above may encounter some less than optimal scenarios. For example, assume a computation graph and scheduling output as illustrated in FIGS. 5A and 5B, respectively. More particularly, FIG. 5A shows a computation graph 510 with nodes A, B, C, D, E, F, G and H connected by directed edges as shown. Recall that nodes are functions or computations associated with the intermediate representation of an ML model. Note that node H is dependent of nodes B and G, node G is dependent of nodes D and F, node F is dependent of nodes C and E, and node E is dependent of node A. FIG. 5B shows an output 520 of independent sets (parts) whereby nodes A, B, C and D are in Set 0, node E is in Set 1, node F is in Set 2, node G is in Set 3 and node H is in Set 4. Recall that the order of execution of the nodes proceeds from lowest set number to highest set number.

From computation graph 510 it is evident that there are many computations to be scheduled in the beginning of the overall computation flow and fewer and fewer ones as the flow progresses to the end. This can result in unbalanced scheduling. For example, as per output 520, all input nodes (A, B, C and D) will be executed in the first round (Set 0) of scheduling. Assume in one example that the input nodes function only to copy parameters from a CPU to a GPU and then copy parameters back to the CPU, without any mathematical operations involved. Nonetheless, the functions associated with nodes A, B, C and D will cause memory allocation in the GPU although one or more functions will be used only later in the overall computation flow. This scenario results in a waste of resources when scheduling. However, scheduling is difficult to optimize due to the lack of locality between the caller and the callee. For example, as is evident in computation graph 510, the output from node B will be used immediately before node H, so node B can be scheduled just before node H, and the output from node B is maintained. That is, after node B is finished executing, the output from node B is kept in the GPU that processed node B and node H is immediately scheduled into the same GPU so that the system can avoid a copy of the output of node B from a remote GPU into remote main memory and then to local main memory and then to a local GPU associated with node H. However, in the above-mentioned scheduling scenario, the output from node B will be kept for too long a time such that it is difficult to track a caller/callee relationship between node B and H (as node B was executed a prohibitively long time before node H will be executed).

Figure 6A:
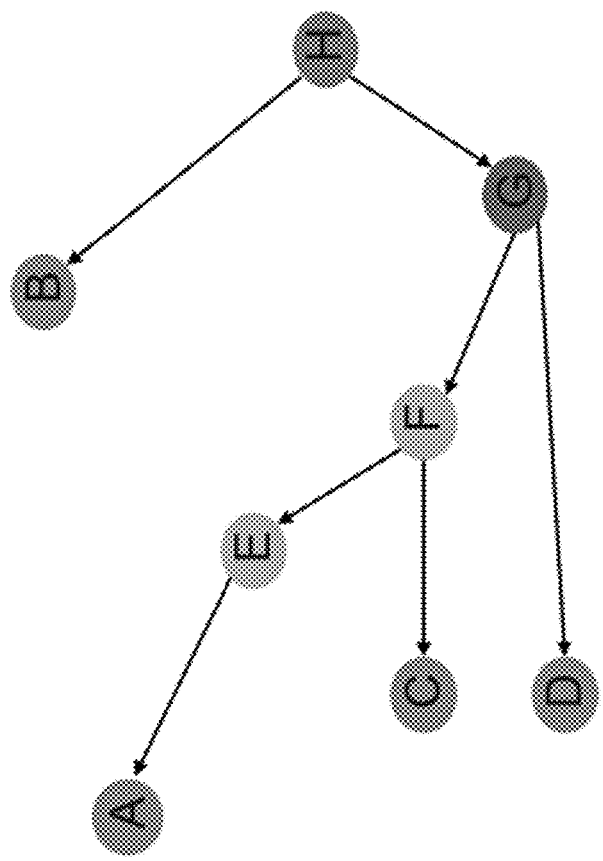
FIGS. 6A through 6C illustrate a computation graph and two partitioned sets of functions, respectively, associated with an artificial intelligence model according to an illustrative embodiment.

Illustrative embodiments overcome the above and other challenges by providing a scheduling solution that uses a reversed computation graph to implement a "scheduling at last moment" (SALM) policy to achieve the above benefits of resource-based scheduling but with more efficiency in terms of parallel computation and resource usage. More particularly, illustrative embodiments use the reversed computation graph generated from the compiler instead of the computation graph itself, and then apply a form of resource-based scheduling as will be explained in further detail herein. For example, as shown in FIG. 6A, assume that computation graph 610 is the reverse of computation graph 510 in FIG. 5A. By "reverse" or "reversed," it is meant that the direction of each edge connecting two nodes is changed to the opposite direction. For example, for nodes B and H, note that in FIG. 5A, there is a directed edge pointing from node B to node H, however, in the reversed computation graph 610, the directed edge now points from node H to node B. The same reversal of the edge direction occurs with the nodes in FIG. 6A as compared with the corresponding nodes in FIG. 5A.

Furthermore, a reversed computation graph is a directed acyclic graph (DAG) as well. Assuming the system has a manager module (e.g., 103 in FIG. 1), the manager module calculates the in-degrees for all computations nodes and removes all nodes with in-degrees of zero. This results in an output 620 of independent sets, as shown in FIG. 6B, whereby node A is in Set 4, nodes E and C are in Set 3, nodes F and D are in Set 2, nodes B and G are in Set 1 and node H is in Set 0. However, recall that the order of execution of the nodes proceeds from lowest set number to highest set number. As such, nodes are not executed as per output 620.

Figure 6C:
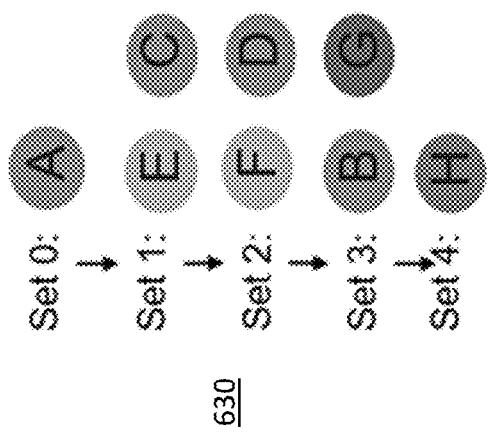
Figure 6B:
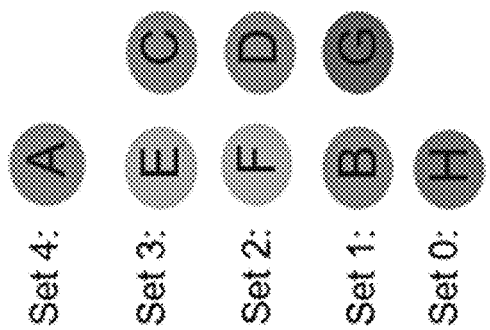

Rather, the independent sets in output 620 are put into a reversed list by the manager module as shown in output 630 in FIG. 6C. More particularly, the nodes of the reversed computation graph node 610 are partitioned as follows: node A is in Set 0, nodes E and C are in Set 1, nodes F and D are in Set 2, nodes B and G are in Set 3 and node H is in Set 4. Thus, output 630 is the final result of reversing the order of independently partitioned sets.

Recall the problem for nodes B and H with output 520 associated with computation graph 510, i.e., the output from node B will be kept for too long a time such that it is difficult to track a caller/callee relationship between node B and H (as node B was executed a prohibitively long time before node H will be executed). However, note now that in output 630, node B executes in Set 3 just before node H in Set 4 executes. Thus, by using the reversed computation graph as explained above, manager module schedules a node (function, computation) just before it becomes needed by a subsequent node (function, computation). This scheduling algorithm is referred to herein as "scheduling at last moment" (SALM).

FIG. 7 illustrates a partition and scheduling algorithm 700 that implements the SALM concept. Algorithm 700 can be executed by a manager module, e.g., manager module 103 in FIG. 1. Algorithm 700 is optimized by merging the reversing of the computation graph into the computing of the in-degrees of all nodes in a complexity O(E) operation, then using the list operation "insert_before" instead of reversing the entire list. More particularly, algorithm 700 includes the following inputs (In), outputs (Out) and steps/operations:

```
        In: the computation graph G₀ generated by Deep Learning Compiler
        Out: a list Lₛ. With:
    1. Each element in Lₛ is a set S.
    2. Each element in a set Sᵢ is a computation node
    3. All nodes in the same set Sᵢ can be scheduled and executed in parallels
    4. All sets in the list Lₛ must be scheduled one by one
        Algorithm:
        Graph G = G₀ // set the original graph as the initial graph
        // Reverse the computation Graph and calculate the IN degrees for all Nodes
        // Loop the Adjacent List of Graph G₀:
        For every Vertex vᵢ in the adjacent list
            // vᵢ and vⱼ are the vertices in G₀
            If there is an edge from vᵢ to vⱼ
                // vᵢᵣ and vⱼᵣ are the vertices in the reversed CG Gᵣ
                Add an edge from vⱼᵣ to vᵢᵣ
                IN degree of vᵢᵣ ++
N = number of vertices in Gᵣ
        Lₛ = [ ] // Initialize an empty list
        While N != 0
        Set S = { } // initialize an empty set for current iteration
        for i = 0..N
            //process all vertices who's in degrees are 0
        if V[i] == 0 begin
            // get the resource requirement for this computation node
            if the remaining resource is enough for this node
                    // remove incident edges of vertex i from the graph Gᵣ
                    for all edges e from i to j begin
                        V[j] --; // decrease the IN degree for node j
                        remove edge e from Gᵣ;
                    end for
                    // remove the vertex itself from the graph Gᵣ
                    remove vertex i from Gᵣ
        // decrease the number of vertices in the graph
                    N--;
                    // add the vertex i into current set
                    add vertex i into s
        else
            // if the remaining resource is not enough, stop this
            // iteration and the nodes which could be executed in
            // parallel with the current tasks in set s are left to
            // next iteration with other computation nodes,
            // whether they are independent or not
            break
        endif
            end for
            // here all vertices who's in-degrees are 0 and can be accommodated in
        // available resource at this moment
        // are processed and the original graph has been degenerated into
        // a new sub-graph
        // add the subset s into the list
        Insert before s to Lₛ
        end while
        return Lₛ
```

Accordingly, it is evident from the above pseudo-code that the complexity of this algorithm is still O(V+E) with O(E) for the reversing operation and calculating the in-degrees of all nodes, and O(V) for traversing the reversed graph—one of the most efficient graph algorithms.

Advantageously, with partition and scheduling algorithm 700 (output 630 in FIG. 6C being an example of an output of algorithm 700), it is evident that:

(i) As a computation is only to be scheduled at the last moment (SALM), the computations in each round of scheduling become more balanced.

(ii) For all input nodes, the allocation of GPU memory is executed when their output is needed for another computation, the executions of these nodes are dispersed in the entire computation, and the usage of GPU memory becomes more efficient.

(iii) Optimization/improvement of scheduling is achieved as the caller/callee computations now are linked together directly by improving the locality between the caller/callee functions (e.g., they are in consecutive partitions).

Figure 8A:
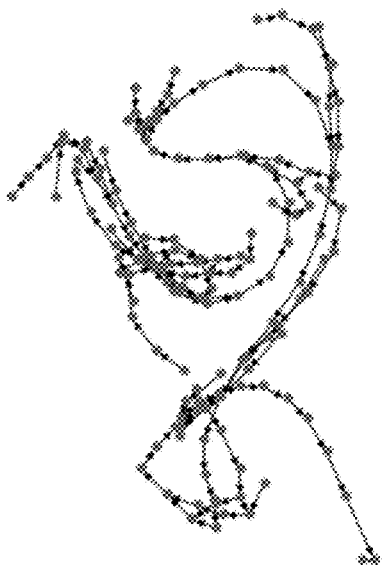
Figure 8B:
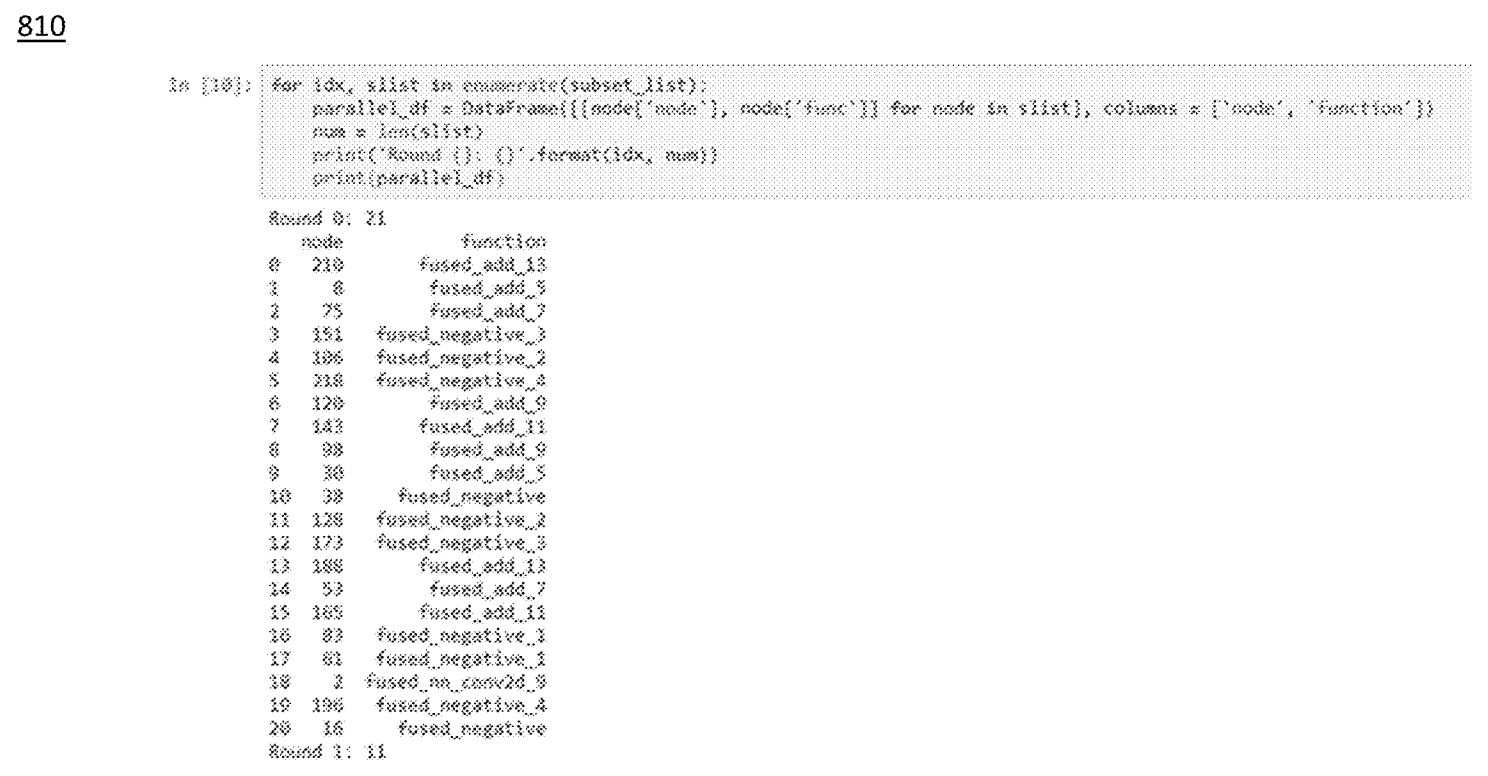
Figure 8C:
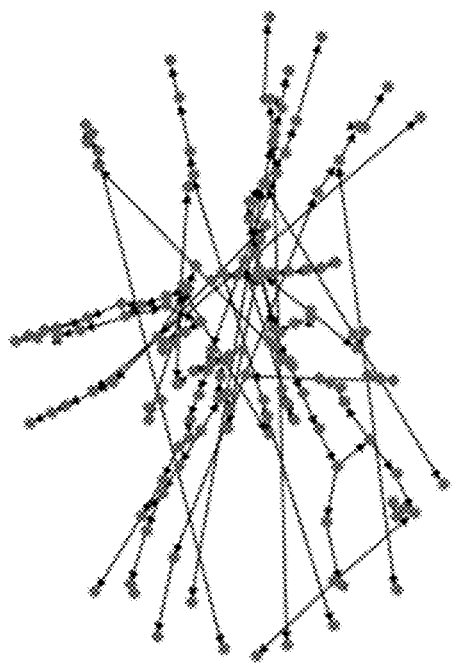
Figure 8D:
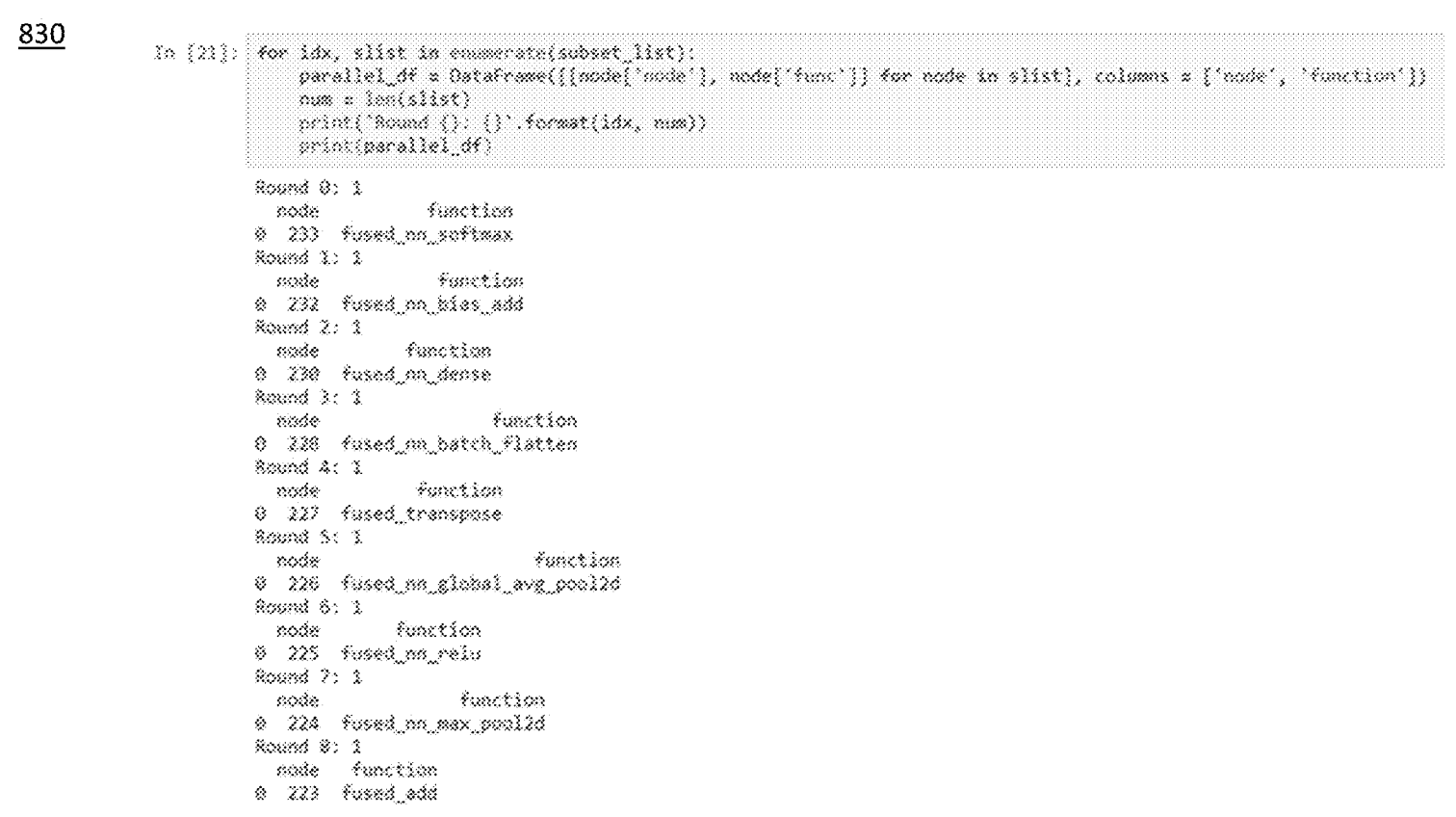
Figure 8E:
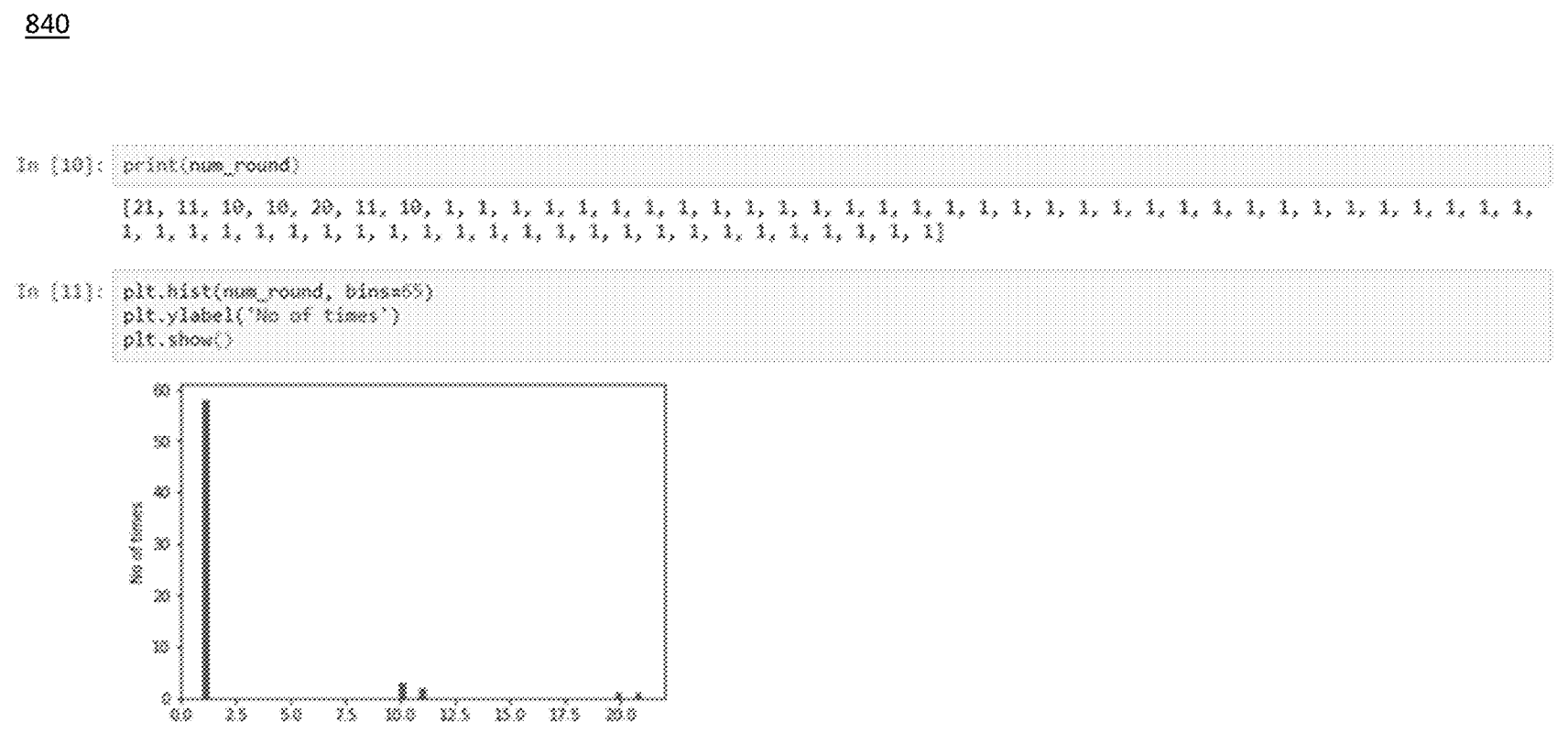
Figure 8F:
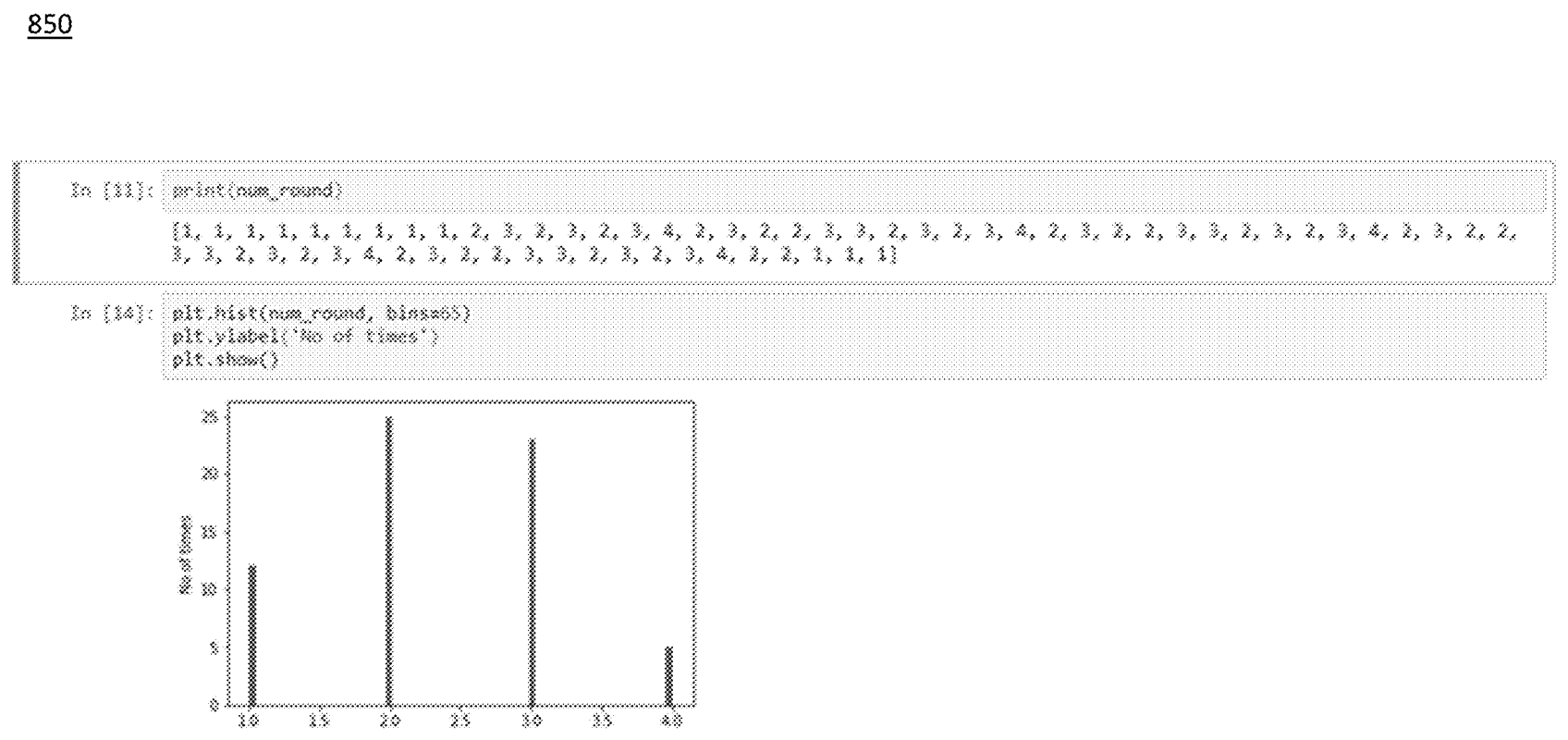

In one illustrative use case, a Keras Cifar10 model is compiled and deployed onto a CUDA GPU. First, an unreversed computation graph 800 is shown in FIG. 8A. FIG. 8B then illustrates a partitioning 810 of the computation graph 800 from FIG. 8A. In comparison, a reversed computation graph 820 is shown in FIG. 8C. FIG. 8D then illustrates a partitioning 830 of the reversed computation graph 820 from FIG. 8C. The distribution of the functions in each round before using the reversed computation graph (i.e., histogram 840 in FIG. 8E) and after using the reversed computation graph (i.e., histogram 850 in FIG. 8F) are shown. As is evident from this use case analysis, the histogram is more equalized when using the reversed computation graph (histogram 850) meaning that the computations are distributed in a more balanced manner.

Figure 9:
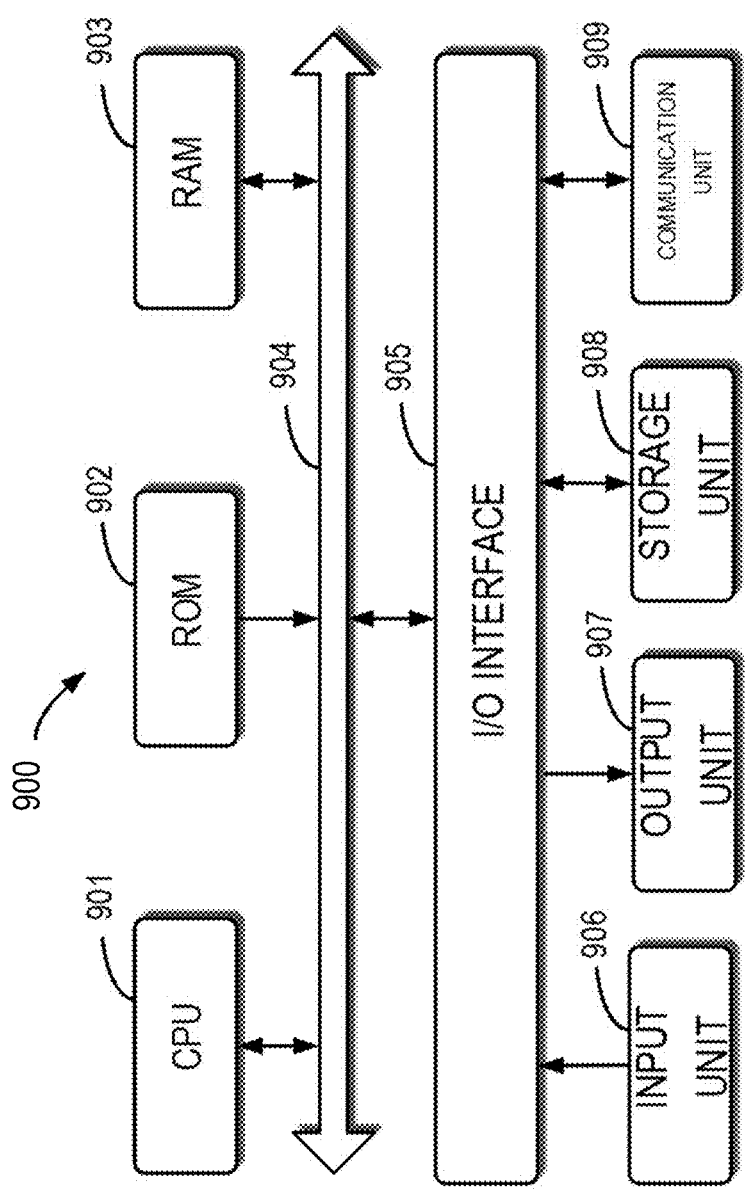
FIG. 9 illustrates an information processing system used to implement a partition and scheduling algorithm associated with an artificial intelligence model according to an illustrative embodiment.

FIG. 9 illustrates a block diagram of an example processing device or, more generally, an information processing system 900 that can be used to implement illustrative embodiments. For example, a manager module (e.g., 103 in FIG. 1) that is configured to execute algorithm 700 may be implemented by the system 900. Note that while the components of system 900 are shown in FIG. 9 as being singular components operatively coupled in a local manner, it is to be appreciated that in alternative embodiments each component shown (CPU, ROM, RAM, and so on) can be implemented in a distributed computing infrastructure, e.g., a cloud computing environment, where some or all components are remotely distributed from one another and executed on separate processing devices, e.g., one or more cloud platforms. In further alternative embodiments, system 900 can include multiple processing devices, each of which comprise the components shown in FIG. 9.

As shown, the system 900 includes a central processing unit (CPU) 901 which performs various appropriate acts and processing, based on a computer program instruction stored in a read-only memory (ROM) 902 or a computer program instruction loaded from a storage unit 908 to a random access memory (RAM) 903. The RAM 903 stores therein various programs and data required for operations of the system 900. The CPU 901, the ROM 902 and the RAM 903 are connected via a bus 904 with one another. An input/output (I/O) interface 905 is also connected to the bus 904.

The following components in the system 900 are connected to the I/O interface 905, comprising: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the system 900 to exchange information/data with other devices through a computer network such as the Internet and/or various kinds of telecommunications networks.

Various processes and processing described above may be executed by the processing unit 901. For example, in some embodiments, methodologies described herein may be implemented as a computer software program that is tangibly included in a machine readable medium, e.g., the storage unit 908. In some embodiments, part or all of the computer programs may be loaded and/or mounted onto the system 900 via ROM 902 and/or communication unit 909. When the computer program is loaded to the RAM 903 and executed by the CPU 901, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising steps of:
obtaining an intermediate representation of an artificial intelligence model written in a source language, the intermediate representation comprising a structured text and being independent of the source language and a target language;
obtaining a reversed computation graph corresponding to a computation graph generated based on the intermediate representation, wherein nodes in the reversed computation graph represent functions related to the artificial intelligence model, and one or more directed edges in the reversed computation graph represent one or more dependencies between the functions, wherein a direction of each directed edge connecting two dependent nodes is reversed in the reversed computation graph; and
partitioning the reversed computation graph into sequential partition sets, such that the partition sets are executed sequentially and functions corresponding to nodes in each partition set are executed in parallel;
wherein partitioning the reversed computation graph into sequential partition sets further comprises:
calculating respective in-degrees for each node within the partition sets, wherein the in-degree of a given node represents a number of directed edges directed to the given node in the reversed computational graph;
identifying a first partition set comprising one or more nodes in the reversed computation graph having an in-degree of zero;
identifying a second partition set comprising one or more nodes in the reversed computation graph to which directed edges of the one or more nodes of the first partition set directly connect;
identifying at least a third partition set comprising one or more nodes in the reversed computation graph to which directed edges of the one or more nodes of the second partition set directly connect;
reordering the first, second and at least the third partition sets into a reversed order such that when a first function depends on a second function in accordance with the computation graph generated based on the intermediate representation, the second function is executed in the third partition set preceding the first function executed in the second partition set; and sequentially executing respective functions of the at least the third partition set, the second partition set and the first partition set; and wherein the steps are performed by one or more processing devices.

2. The method of claim 1, further comprising determining one or more resources needed to execute functions within a given partition set prior to executing the functions in the given partition set.

3. The method of claim 2, further comprising scheduling one or more functions in the given partition set to another partition set when at least a portion of the one or more resources needed to execute the functions within the given partition set are unavailable.

4. The method of claim 1, wherein the first function and the second function are executed by a given resource of one or more resources needed to execute functions.

5. The method of claim 1, wherein identifying the at least a third partition set comprises:
identifying at least a fourth partition set comprising one or more nodes to which directed edges of the one or more nodes of the third partition set directly connect.

6. The method of claim 1, wherein at least one of the first partition set, the second partition set and the at least a third partition set comprises multiple nodes.

7. An apparatus, comprising:
a processor; and
a memory storing computer program instructions, the processor executing the computer program instructions in the memory to control the apparatus to:
obtain an intermediate representation of an artificial intelligence model written in a source language, the intermediate representation comprising a structured text and being independent of the source language and a target language;
obtain a reversed computation graph corresponding to a computation graph generated based on the intermediate representation, wherein nodes in the reversed computation graph represent functions related to the artificial intelligence model, and one or more directed edges in the reversed computation graph represent one or more dependencies between the functions, wherein a direction of each directed edge connecting two dependent nodes is reversed in the reversed computation graph; and
partition the reversed computation graph into sequential partition sets, such that the partition sets are executed sequentially and functions corresponding to nodes in each partition set are executed in parallel;
wherein partitioning the reversed computation graph into sequential partition sets further comprises:
calculating respective in-degrees for each node within the partition sets, wherein the in-degree of a given node represents a number of directed edges directed to the given node in the reversed computational graph;
identifying a first partition set comprising one or more nodes in the reversed computation graph having an in-degree of zero;
identifying a second partition set comprising one or more nodes in the reversed computation graph to which directed edges of the one or more nodes of the first partition set directly connect;
identifying at least a third partition set comprising one or more nodes in the reversed computation graph to which directed edges of the one or more nodes of the second partition set directly connect; and reordering the first, second and at least the third partition sets into a reversed order such that when a first function depends on a second function in accordance with the computation graph generated based on the intermediate representation, the second function is executed in the third partition set preceding the first function executed in the second partition set; and
sequentially executing respective functions of the at least the third partition set, the second partition set and the first partition set.

8. The apparatus of claim 7, wherein the processor executes the computer program instructions in the memory to further control the apparatus to determine one or more resources needed to execute functions within a given partition set prior to executing the functions in the given partition set.

9. The apparatus of claim 8, wherein the processor executes the computer program instructions in the memory to further control the apparatus to schedule one or more functions in the given partition set to another partition set when at least a portion of the one or more resources needed to execute the functions within the given partition are unavailable.

10. The apparatus of claim 7, wherein the first function and the second function are executed by a given resource of one or more resources needed to execute functions.

11. The apparatus of claim 7, wherein identifying the at least a third partition set comprises:
identifying at least a fourth partition set comprising one or more nodes to which directed edges of the one or more nodes of the third partition set directly connect.

12. The apparatus of claim 7, wherein at least one of the first partition set, the second partition set and the at least a third partition set comprises multiple nodes.

13. The apparatus of claim 7, wherein the source language is written in different source languages.

14. A computer program product stored on a non-transitory computer-readable storage medium and comprising machine executable instructions, the machine executable instructions, when executed, causing a processing device to:
obtain an intermediate representation of an artificial intelligence model written in a source language, the intermediate representation comprising a structured text and being independent of the source language and a target language;
obtain a reversed computation graph corresponding to a computation graph generated based on the intermediate representation, wherein nodes in the reversed computation graph represent functions related to the artificial intelligence model, and one or more directed edges in the reversed computation graph represent one or more dependencies between the functions, wherein a direction of each directed edge connecting two dependent nodes is reversed in the reversed computation graph; and
partition the reversed computation graph into sequential partition sets, such that the partition sets are executed sequentially and functions corresponding to nodes in each partition set are executed in parallel;
wherein partitioning the reversed computation graph into sequential partition sets further comprises:
calculating respective in-degrees for each node within the partition sets, wherein the in-degree of a given node represents a number of directed edges directed to the given node in the reversed computational graph;

identifying a first partition set comprising one or more nodes in the reversed computation graph having an in-degree of zero;

identifying a second partition set comprising one or more nodes in the reversed computation graph to which directed edges of the one or more nodes of the first partition set directly connect;

identifying at least a third partition set comprising one or more nodes in the reversed computation graph to which directed edges of the one or more nodes of the second partition set directly connect;

reordering the first, second and at least the third partition sets into a reversed order such that when a first function depends on a second function in accordance with the computation graph generated based on the intermediate representation, the second function is executed in the third partition set preceding the first function executed in the second partition set; and sequentially executing respective functions of the at least the third partition set, the second partition set and the first partition set.

15. The computer program product of claim 14, further comprising determining one or more resources needed to execute functions within a given partition set prior to executing the functions in the given partition set.

16. The computer program product of claim 15, further comprising scheduling one or more functions in the given partition set to another partition set when at least a portion of the one or more resources needed to execute the functions within the given partition set are unavailable.

17. The computer program product of claim 14, wherein the first function and the second function are executed by a given resource of one or more resources needed to execute functions.

18. The computer program product of claim 14, wherein identifying the at least a third partition set comprises:
    identifying at least a fourth partition set comprising one or more nodes to which directed edges of the one or more nodes of the third partition set directly connect.

19. The computer program product of claim 14, wherein at least one of the first partition set, the second partition set and the at least a third partition set comprises multiple nodes.

20. The computer program product of claim 14, wherein the source language is written in different source languages.

* * * * *

UNITED STATES PATENT AND TRADEMARK OFFICE
CERTIFICATE OF CORRECTION

| | |
|---|---|
| PATENT NO. | : 11,579,924 B2 |
| APPLICATION NO. | : 16/789006 |
| DATED | : February 14, 2023 |
| INVENTOR(S) | : Jin Li et al. |

It is certified that error appears in the above-identified patent and that said Letters Patent is hereby corrected as shown below:

In the Claims

Claim 7, Column 13, Line 67, please delete "and"

Signed and Sealed this
Fourteenth Day of March, 2023

*Katherine Kelly Vidal*

Katherine Kelly Vidal
*Director of the United States Patent and Trademark Office*